Feb. 18, 1941.　　　H. W. LODER　　　2,232,671
THROW-OUT AND BELT TENSIONING MECHANISM FOR POWER LAWN MOWERS
Filed March 23, 1939　　　2 Sheets-Sheet 1

INVENTOR.
BY Howard W. Loder
Geo. S. Conrad
ATTORNEY.

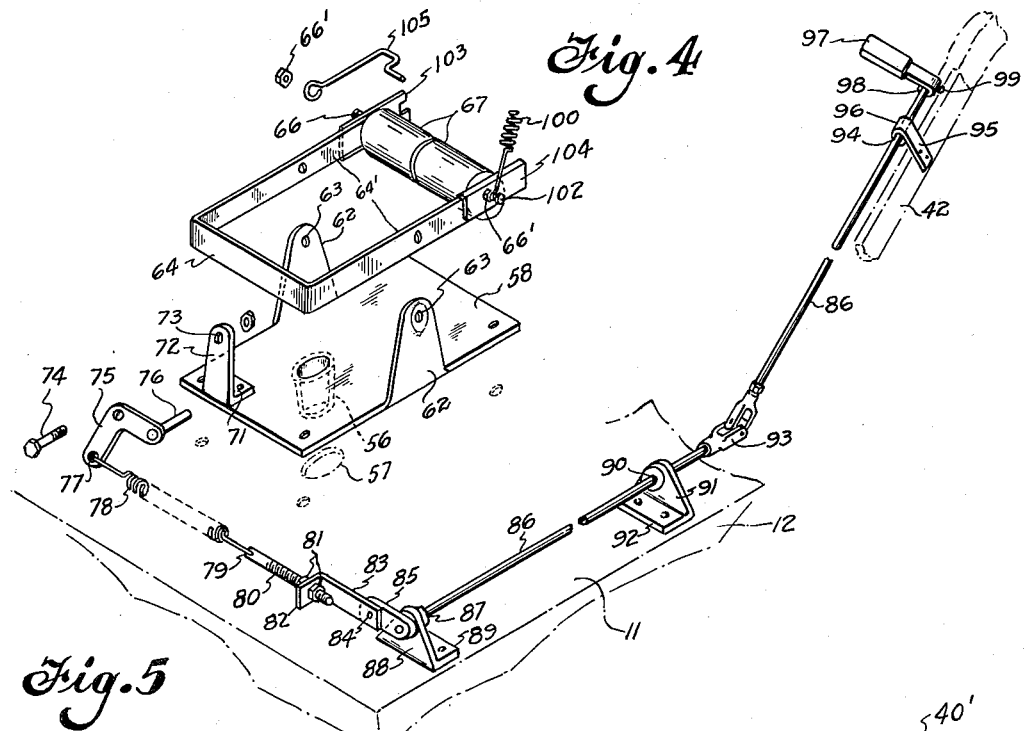

Patented Feb. 18, 1941

2,232,671

UNITED STATES PATENT OFFICE 2,232,671

THROW-OUT AND BELT TENSIONING MECHANISM FOR POWER LAWN MOWERS

Howard W. Loder, Montclair, N. J., assignor to Whirlwind Lawn Mower Corporation, a corporation of Louisiana Application March 23, 1939, Serial No. 263,627

6 Claims. (Cl. 56—25.4)

This invention relates to new and useful improvements in power lawn mowers of the type employing horizontal rotatable cutters, in which the power drive to the cutter is belt operated.

In the operation of lawn mowers, it is many times necessary to move from one plot of ground on which cutting is being done to another. Under such conditions, it is most desirable to be able to propel the mower under its own power. In the mowers of the rotary blade type heretofore in use, operation of the propelling drive mechanism also resulted in operation of the cutter housing transmission. With the cutter arm thus revolving the cutting arm and blades can be damaged through contact with sticks, stones or other obstructions which are particularly present on gravel roadways or paths over which in such instances the mower is many times propelled. Again, such mowers, because of their adaptability, are many times used to clean out extremely high and thick stands of grass in which refuse and obstructions of various kinds are present and which the mower operator fails to discover until the cutter arm and blades come in contact therewith. It is obvious that only prompt and immediate withdrawal from such contact or in the alternative, means for stopping the rotation of the cutting arm and blades can prevent serious damage to the mower.

It is an object of my invention to provide a simple and efficient means of engaging or disengaging the cutter housing transmission at the election of the operator, without in any way interfering with the continued operation of the motor which also provides propulsion for the mower.

Another object of this invention is to provide an equalized tension on the belt of the cutter housing transmission when it is in operation. With the belts generally used, slippage incident to wear and stretch of such belts has heretofore imposed a penalty of inefficiency in the operation of the drive.

With these and other objects in mind, this invention may consist of certain novel features of construction which will be best understood from the following description read in light of the accompanying drawings, illustrating one specific embodiment of my invention, and in which like numerals indicate like parts.

In the accompanying drawings:

Figure 4 is a schematic view of the parts of my invention;

Figure 5 is a front elevation of my invention in its disengaged position;

Figure 6 is a view taken on the line 6—6 of Figure 5;

Figure 7 is a front elevation of my invention in its engaged position; and

Figure 8 is a view taken on the lines 8—8 of Figure 7.

Figure 1:
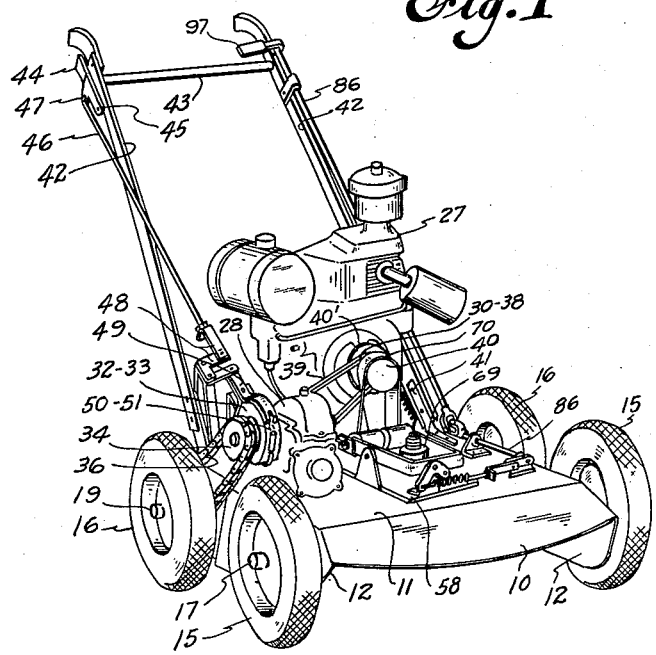
Figure 1 is a perspective view of a power mower embodying the present invention.

It is to be understood that my invention is not to be limited by the exact embodiment of the device shown, which is merely by way of illustration and not limitation, as various other forms of the devices may be apparent to those skilled in the art without departing from the spirit of the invention or the scope of the appended claims.

In the accompanying drawings, the numeral 10 designates the conventional inflexible housing with a top wall 11, side walls 12 and a rear wall 13 pivotally secured and extending downwardly at an obtuse angle which permits any cut material to easily clear from the under part of the mower. The top, side and rear walls of the housing are substantially free of any openings and thus define a confined air space open only to the ground and the forward end of the housing.

The housing is mounted on front and rear pneumatic wheels. The front wheels 15 are suitably rotatably mounted on stub axles 17, which are threaded and locked in angles 18 on the underside of the top and side walls 11 and 12.

A through transverse axle 19 with proper bearings suitably secured, is enclosed in an axle housing 20, which is attached as at 21 by U-bolts 22 to the underside of the top wall 11.

Spaced away from, but adjacent to, the side wall 12, on the axle 19, is a conventional differential 25 comprising cover plates, bevel and pinion gears and a spider. Secured between the spider and the inner cover plate is a sprocket 26. The hub of one of the beveled gears is locked in the bore of a wheel hub of one of the rear pneumatic wheels 16, which in turn acts as the outer cover plate of the differential.

Mounted on the top wall 11 of the housing 10 medially between the side walls 12 and over the axle housing 20 is a motor 27. To the front and right of the motor a speed reducer 28 is mounted, on the input shaft of which is locked a double groove, V-belt pulley 30, and on the output shaft of which is suitably secured a twin disc clutch 32, the facings 33 of which are engageable with a sprocket 34. The sprocket 34 is in alignment with the sprocket 26 and connected therewith by a suitable endless chain 36. The motor shaft carries a double groove V-belt pulley 38, which is aligned with the V-belt pulley 38 of the speed reducer 28. The respective V-belt pulleys 30 and 38 are so designed that regardless of which set of complementary grooves are in use, a V-belt 39 of a length suitable for the one set of complementary grooves is also adaptable to the other set of grooves. The pitch diameter of the grooves is, however, varied so as to give a predetermined selection of the revolutions per minute that are taken by the speed reducer input shaft so that a substantial variation in speed may be obtained by using either one set of grooves or the other. A flat belt pulley 40 is also keyed to the outer end of the motor shaft and interposed between the flat belt pulley 40 and the V-belt pulley 38 is a keyed circular flat belt pulley guard 40', which is also carried by the motor shaft. The purpose of both the flat belt pulley 40 and the guard 40' will hereafter more fully appear.

Securely fastened on opposite sides of the motor are handle brackets 41 slotted so as to permit adjustment of the angle at which the handles 42 are projected upwardly and rearwardly from the mower housing 10. The handles are braced against lateral displacement by the tubular member 43.

Clutch operating mechanism consisting of a handle member 44 pivotally secured to the mower handle as at 45, a tie rod 46, adjustable as to length, secured as at 47, to the handle 44, linkage 48 secured to the lower end of the tie rod 46, and an open end U-shaped member 49, slotted to fit the studs 50 of the clutch collar 51, and secured to the lower end of linkage 48, permits an operator to easily engage or disengage the clutch facings 33 with the driving sprocket 34. With the motor 27 operating, engagement of the clutch facings 33 with the sprocket 34 transmits propelling power to the driven sprocket 26 and hence to the axle 19 and its wheels 16. The tie rod 46 adjustment is afforded so that change of the angle at which the handles 42 project from the mower housing 10 will be permissible without disrupting the linkage 48 or its pivotal connection with the U-shaped member 49.

Within the housing 10 is a horizontally disposed rotatable cutter arm 52, to the ends of which cutter blades 53 are appropriately secured. The cutter arm is mounted to the lower end of a removable cutter shaft 54, which extends upwardly through a complementary sleeve 55, which in turn is supported for rotation in bearings within a cylindrical bearing housing 56, the upper end of which extends through an opening 57 in the top wall of the housing 10, and has a flange 58 resting upon and secured to this top wall.

Figure 3:
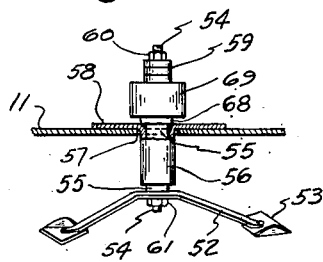
Figure 3 is a detail view of the cutter housing.
Figure 2:
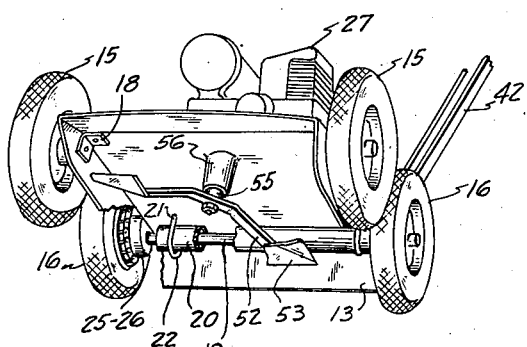
Figure 2 is an up-tilted view of the mower.

The shaft 54 is provided with a left hand thread at its lower extremity and a right hand thread at its upper end. Spacers 59 bored to the diameter of the shaft are removable therefrom. By removing one or more of the spacers from the shaft in the position in which they are shown in Figure 3, and placing them on the shaft adjacent the cutter arm between the cutter arm and the lower periphery of the sleeve 55, the height at which the cutter arm may be operated can be adjusted within the range afforded by the width of the spacers. With the spacers in place, the length of the shaft 54 is such that by tightening either or both of the nuts 60 or 61, the shaft is locked against rotation in the sleeve 55.

Spaced on opposite edges of the flange 58 are bosses 62. The bosses are threaded as at 63 and carry a U-shaped frame 64, which is pivotally movable in and out of a horizontal plane, and is secured by threaded hardened bolts 65. The closed end of the U-frame 64 extends toward the forward end of the mower. The arms 64' of the U-frame are bored adjacent their ends and carry a shaft 66. Two identical idler pulleys 67 are supported for rotation on bearings carried by the shaft 66.

The sleeve 55 is shouldered as at 68 and has keyed to its outer periphery above the shoulder a flat belt pulley 69. A flat belt 70 is placed in operable contact with the cutter sleeve pulley 69, the idler pulleys 67 and the flat belt motor pulley 40 as is best disclosed by Figures 6 and 8.

Secured to the flange 58 as at 71, to in no way interfere with the pivotal play of the U-shaped frame 64, is an angle member 72 bored as at 73. A headed shaft 74 is seated in the bore 73. Interposed between the head of the shaft 74 and the member 72 in a freely pivotal relationship is a link 75. A stud 76 of a length sufficient to extend under the bottom periphery of the U-shaped frame 64 adjacent the member 72, is secured to one end of the link 75 and as so located is medial of the forward end of the U-shaped frame. To the other end of the link 75, as at 77, is secured one tail of a tension spring 78. The other tail of the spring 78 is secured as at 79 to a threaded bolt 80 adjustably held by its complementary nuts 81 to an ear 82 of a member 83.

The member 83 is pivotally secured as at 84 to one end of an arm 85, which is secured at its other end to a rod 86. A bearing for the rod 86 is afforded by the bore 87 in the upturned flange 88 of a member 89, which rests on the wall 11 and is suitably fastened thereto. The rod 86 extends rearwardly along the top of the wall 11 and is maintained in its parallel relationship through the medium of an additional bearing afforded by a bore 90 in the upturned flange 91 of a member 92, which also rests on and is fastened to the wall 11. The extension of the rod 86 is continued to substantially the rear edge of the wall 11 at which point a universal joint 93 is interposed. The rod is then extended parallel along the length of the handle 42 and held in such relationship by a bearing afforded by the bore 94 of a flange 95 of a member 96. A handle 97 is secured at right angles to the rod 86 as at 98, and is adjustable as to its position on the rod 86 by a set screw 99.

The operator of a mower to which my invention is applied may, by placing the handle 97 of the rod 86 in the position shown in Figures 4 and 5, disengage the flat belt 70 from operable contact with its complementary pulleys 40, 67 and 69 and the rotatable cutter arm 52 comes to a complete stop. The belt disengagement action is transmitted through the universal joint 93 to the arm and link 85 and 75, so that the forward end of the U-shaped frame 64 is freed from the support of the stud 76 and the action of a spring 100 secured as at 101 and 102 effects a positive release of the idler pulleys 67 from any engagement with the flat belt 70, which in turn frees the belt from operable contact with the pulleys 40 and 69.

As the belt 70 is released from engagement with the pulleys 67, the belt slack thus created tends to throw the belt outwardly and rearwardly toward that portion of the arms 64' of the U-shaped frame 64, which extend toward the motor 27 and toward the guard 40'. To assure retention of the belt within the limits defined by the arms 64' left and right belt guards 103 and 104 are secured to the sides of the arms 64' of the U-shaped frame 64 by being interposed between the arms and the retaining nuts 66' of the shaft 66. In addition, a belt-retaining arm 105 is also interposed between one of the arms and the retaining nut 66' of the shaft 66 and as secured extends through the slot of the guard 103 in such position that the back of the belt will come in contact therewith as the belt is urged outwardly and rearwardly as is best shown in Figure 6. This contact is sufficient to hold the belt free of the pulley 40 and the continued rotation of that pulley will not damage the belt. At the same time, the contact is such that as the handle 97 is placed in the position shown in Figure 7, the belt 70 will release readily without damage or wear to its outer casing. The provision of the guard 40' in turn prevents the belt from being displaced from the pulley 40 in a rearward direction.

To obtain operable contact between the flat belt 70 and the pulleys 40, 67 and 69, the operator turns the handle 97 to the position shown in Figure 7. The stud 76 then raises the forward end of the U-shaped frame 64 sufficiently to place the idler pulleys 67 in engagement with the belt and the consequent transmission of power to the cutter arm 52 rotates it at cutting speed.

Any normal stretch or wear in the flat belt 70 is compensated for by the tension of the spring 78, which in its extended position, as shown in Figure 7, exerts a constant pressure on the flat belt. This pressure maintains the proper flat belt tension, prevents belt slippage, and also overcomes any contrary action of the spring 100. Should abnormal wear or belt stretch occur, the same may be compensated for by tightening the threaded bolt 80, which changes the angle of the link 75 so that the stud 76 is permitted to engage the lower periphery of the U-shaped frame 64 through a longer path of effective travel and consequently the same relative tension of the spring 78 is maintained.

What I claim as my invention is:

1. In a mower of the character described, a wheel supported housing, a mower handle secured to said housing, a motor mounted on the housing, a pulley keyed to the crank shaft of said motor, a transmission housing mounted on said first mentioned housing, a U-shaped frame pivotally secured to said transmission housing in a plane above both of said housings, rotatable means adjacent the open end of said U-shaped frame, rotatable means carried by said transmission housing, a flat belt, said flat belt, transmission carried rotatable means, U-shaped frame carried rotatable means and pulley co-acting to effect rotation of a cutting element within said first mentioned housing and means manually operable from said handle to effect a change in the position of said U-shaped frame whereby said co-action between said elements ceases.

2. In a power mower, a wheel supporting housing having top, side and rear walls defining a confined air space open to the ground, a mower handle adjustably secured to said housing, a motor mounted on the housing, means connected to the motor to propel the mower, a pulley keyed to the crank shaft of said motor, a transmission housing mounted on said first mentioned housing, means rotatably carried by said transmission housing and extended into said air space, a pulley mounted on said rotatable means above the top wall of said first mentioned housing, a U-shaped frame pivotally secured to said transmission housing in a plane above both of said housings, idler pulleys secured adjacent the open end of said U-shaped frame, a flat belt engageable with all said pulleys, means which in one position co-acting with said U-shaped frame engage the flat belt with said pulleys under a maintained tension whereby a cutter carried by said rotatable means is rotated within said air space and which in another position disengages said pulleys from operable contact with said belt whereby rotation of the cutter within said air space ceases, and a control operable from said handle by which either of said positions may be selected without affecting the operable relationship of said propelling means and motor.

3. In a power mower, a wheel supported housing having top, side and rear walls defining a confined air space open to the ground, a mower handle mounted to said housing, a power source mounted on the housing, means connected to the power source to propel the mower, means to disengage the propelling means and power source, a pulley keyed to the crank shaft of said power source, a transmission housing mounted on said first mentioned housing, a sleeve rotatably secured in said transmission housing and extended into said air space, a shaft secured against rotation within said sleeve and also extended into said air space, a second pulley mounted on said sleeve, idler pulleys shaft carried by a U-shaped frame pivotally interposed between said first and second mentioned pulleys and in a plane above said housing, a flat belt engaging said first and second mentioned pulleys and said idler pulleys, a bell crank positioned to hold said U-shaped frame in a substantially horizontal plane over said housings whereby a predetermined tension is maintained on said belt and a cutter carried by said shaft is rotated within said air space, and linkage manually operable from said mower handle to change the position of said bell crank and the plane of said U-shaped frame whereby operable engagement between said flat belt and said pulleys cease.

4. In a power mower, a wheel supported housing having top, side and rear walls defining a confined air space open to the ground, a mower handle mounted to said housing, a motor mounted on the housing, means connected to the motor to propel the mower, a pulley keyed to the crank shaft of said motor, a transmission housing mounted on said first mentioned housing, means rotatably carried by said transmission housing and extended into said air space, a cutter in a horizontal plane within said air space secured to the rotatable means of said transmission housing, a pulley mounted on the rotatable means of said transmission housing above the top wall of said first mentioned housing, a U-shaped frame pivotally secured to said transmission housing in a plane above both of said housings, idler pulleys secured adjacent the open end of said U-shaped frame, a flat belt engageable with all said pulleys, a bell crank which in one position co-acting with said U-shaped frame engages the flat belt with said pulleys under a pre-determined tension whereby said cutter is rotated within said air space and which in another position permits disengagement of said pulleys from operable contact with said belt whereby rotation of said cutter ceases, and linkage manually controlled from said mower handle to affect selection of said bell crank positions without affecting the operable relationship of said propelling means and motor.

5. In a power mower, a wheel supported housing having top, side and rear walls defining a confined air space open to the ground, a mower handle mounted to said housing, a power source mounted on said housing, a pulley keyed to the crank shaft of said power source, a transmission housing mounted on said first mentioned housing, means rotatably carried by said transmission housing and extended into said air space, a pulley mounted on said rotatable means above the top wall of said first mentioned housing, a U-shaped frame pivotally secured to said transmission housing in a plane above both of said housings, idler pulleys secured adjacent one end of said U-shaped frame, a flat belt engageable with all of said pulleys, a crank mounted on said first mentioned housing which in one position co-acting with said U-shaped frame engages the flat belt with said pulleys under a predetermined tension whereby said cutter is rotated within said air space and which in another position permits disengagement of said pulleys from operable contact with said belt whereby rotation of said cutter ceases, and linkage mounted on said first mentioned housing and said handle and manually controlled from said handle to affect selection of said crank positions.

6. In a power mower, a wheel supported housing having top, side and rear walls defining a confined air space open to the ground, a mower handle mounted to said housing, a power source mounted on said housing, means connected to the power source to propel the mower, means to disengage the propelling means and power source, a pulley keyed to the crank shaft of said power source, a transmission housing mounted on said first mentioned housing, means rotatably carried by said transmission housing and extended into said air space, a pulley mounted on said rotatable means above the top wall of said first mentioned housing, a U-shaped frame pivotally secured to said transmission housing in a plane above both of said housings, idler pulleys secured adjacent one end of said U-shaped frame, a flat belt engageable with all of said pulleys, a crank mounted on said first mentioned housing which in one position co-acting with said U-shaped frame engages the flat belt with said pulleys under a predetermined tension whereby said cutter is rotated within said air space and which in another position permits disengagement of said pulleys from operable contact with said belt whereby rotation of said cutter ceases, and linkage mounted on said first mentioned housing and said handle and manually controlled from said handle to affect selection of said crank positions without affecting the operable relation of said propelling means and motor.

HOWARD W. LODER.